United States Patent

Kalsi

[15] 3,706,320

[45] Dec. 19, 1972

[54] PRESSURE DROP VARIATION COMPENSATING AND VALVE POSITIONING MECHANISM

[72] Inventor: Manmohan S. Kalsi, Houston, Tex.

[73] Assignee: ACF Industries, Incorporated, New York, N.Y.

[22] Filed: Sept. 21, 1971

[21] Appl. No.: 182,344

[52] U.S. Cl. ..........137/487, 137/454.6, 137/625.37, 251/361
[51] Int. Cl. .............................................G05d 7/03
[58] Field of Search.....137/487, 489.5, 492.5, 454.6, 137/625.37; 73/205, 206; 251/361

[56] References Cited

UNITED STATES PATENTS 2,111,837  3/1938  Brisbane..............................137/487
2,399,938  5/1946  Pett......................................137/487
2,858,700  11/1958  Rose................................137/487 X Primary Examiner—Henry T. Klinksiek
Assistant Examiner—Robert J. Miller
Attorney—Eugene N. Riddle et al.

[57] ABSTRACT

A valve having a pneumatic operator and a linear port opening rate is provided with mechanism for compensating variations in the pressure drop across the valve, in order to make the flow a linear function of a control signal. A pressure sensitive device produces a rotation of a square root cam proportional to the pressure drop across the valve. The displacement produced by the cam is multiplied by the control signal and the product is added to a displacement proportional to the control signal. The resulting quantity is compared with the position of the valve stem, and the difference is used to adjust a pilot valve which controls the operator and resets it so as to compensate the variation in the pressure drop across the valve.

8 Claims, 4 Drawing Figures

INVENTOR.
MANMOHAN S. KALSI

PRESSURE DROP VARIATION COMPENSATING AND VALVE POSITIONING MECHANISM

BACKGROUND OF THE INVENTION

In some control systems the pressure drop across a control valve is either constant or monotonically increasing or decreasing as the flow is increased. By using one of the standard characterized ports (such as linear, quick-open, equal percentage, etc.), the valve can be designed to nullify the effect of the variation of the pressure drop on the flow in order to achieve a fairly linear stem travel versus flow response from the valve. In many control systems, however, the pressure drop does not vary monotonically or remain constant. In order, then, to design ports which compensate for the effect of such variations of the pressure drop on flow, the valve must be custom designed for one particular application. Such custom designing involves trial and error, and is usually expensive. It has, therefore, been proposed to provide valves with means for compensating variations of the pressure drop and producing a linear flow response. It is an object of this invention to provide a reliable, pneumatically operated system of this type, in which the position of the valve is compared with and adjusted to balance a control signal plus a compensating signal.

SUMMARY OF THE INVENTION

In order to obtain a flow which is independent of variations of the pressure drop across a valve, the present invention imparts to a valve a compound movement, one component $\Delta X$ of which is proportional to a controller signal, and another component $\Delta Y$ of which compensates for the variation of pressure drop across the valve. If the pressure drop across the valve falls from $\Delta P1$ to $\Delta P2$ as the valve is moved a distance $\Delta X$, it can be shown that the additional compensating movement is:

$$\Delta Y = \Delta X [(\sqrt{\Delta P1}/\sqrt{\Delta P2}) - 1]$$

To cause this compensation, the controller signal pressurizes a bellows which moves a link connected pivotally to one end of a beam. The other end of the beam is moved by the valve stem. A pilot relay valve is pivotally connected to an intermediate point of the beam. Whenever the bellows moves in response to a control signal, the pilot valve is actuated to vary the air pressure supplied to the diaphragm of the operator of the main valve, until a balance is achieved. The lower end of the beam is moved, not only by the control signal, but also by a superimposed signal consisting of the product of the control signal and a displacement proportional to the square root of the pressure drop across the valve. The port of the valve is designed so that under these conditions the flow through the valve will be a linear function of the control signal, regardless of the pressure drop across the valve.

DESCRIPTION OF THE PREFERRED EMBODIMENT

Figure 1:
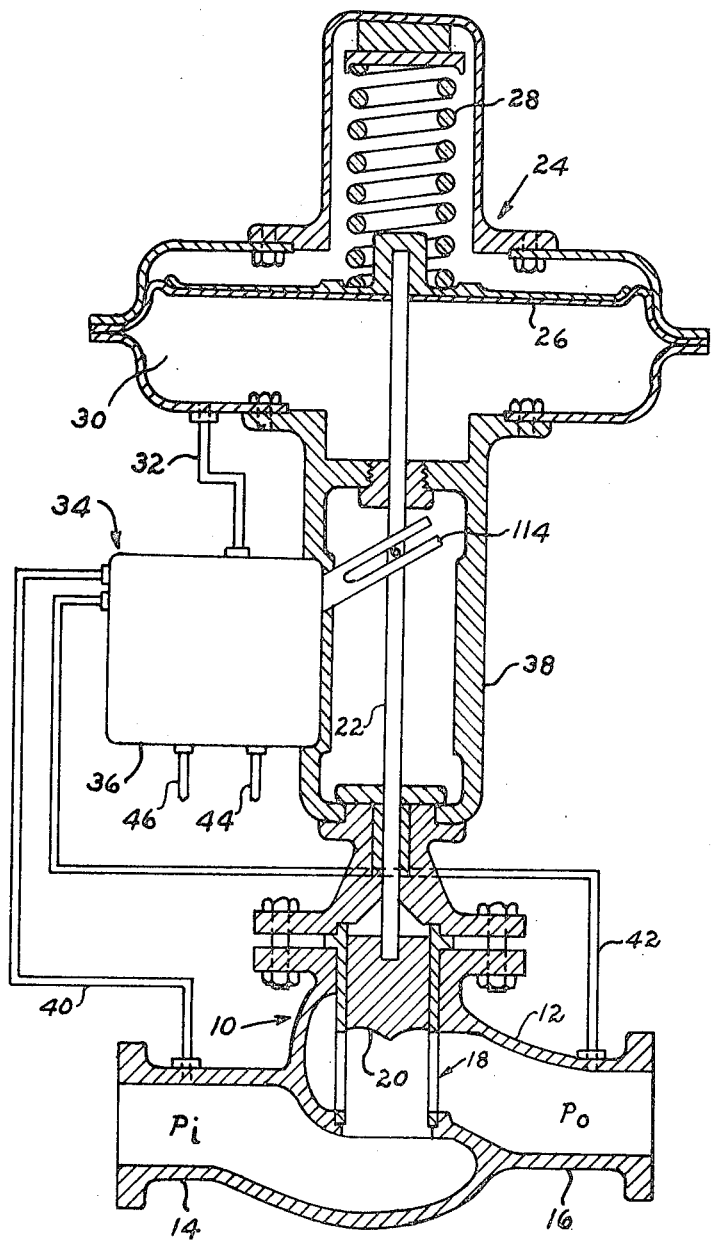
FIG. 1 is a view partly in section of a valve with control mechanism according to the invention.

The invention is applicable to linear valves generally, one example of which is shown in FIG. 1. Valve 10 has a body portion 12 provided with an inlet 14 and an outlet 16. A cage 18 having suitable openings is interposed between inlet 14 and outlet 16. Reciprocable valve plug 20 moves upward to open cage 18 progressively. Plug 20 has a stem 22 which extends into actuator 24 and is fastened to diaphragm structure 26. Actuator 24 is of the pneumatic type and includes a spring 28 which urges the valve toward its closed position. The valve is opened by supplying air under pressure to chamber 30 through conduit 32. Since valves and actuators of this type are well known in the art, the details thereof need not be elaborated upon. The control mechanism 34, which constitutes the heart of the invention, will be described fully in connection with FIG. 4. Control mechanism 34 is contained in a casing 36 connected to yoke 38. Conduits 40 and 42 feed the inlet pressure $P_i$ and the outlet pressure $P_o$ to control mechanism 34. The latter is also connected to a source of air pressure 44 and an air pressure controller signal supply conduit 46.

Figure 2:
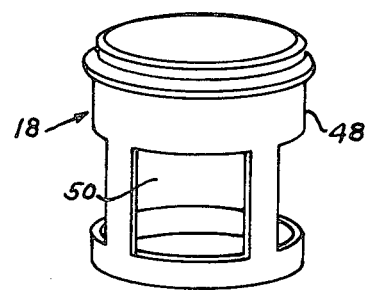
FIG. 2 is a perspective view of a valve cage.
Figure 3:
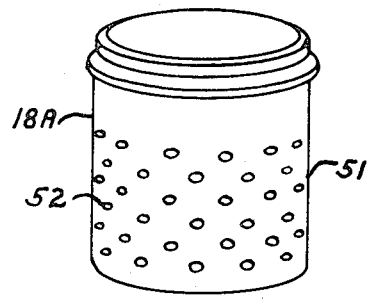
FIG. 3 is a perspective view of an alternative cage which may be employed in the valve.

Since it is required that the valve have an effective port opening which varies linearly with the movement of valve member 20, cage 18 comprises cylinder 48 which may be formed with rectangular windows 50 as shown in FIG. 2. The total area of these windows which is opened as valve member 20 moves upward will obviously be proportional to the movement of the valve member. The same result substantially can be obtained by the use of a cage such as 18A shown in FIG. 3, wherein cylinder 51 has a large number of uniformly distributed small openings 52 through which the flow occurs. Cylinder 51 is, of course, open at the bottom.

Figure 4:
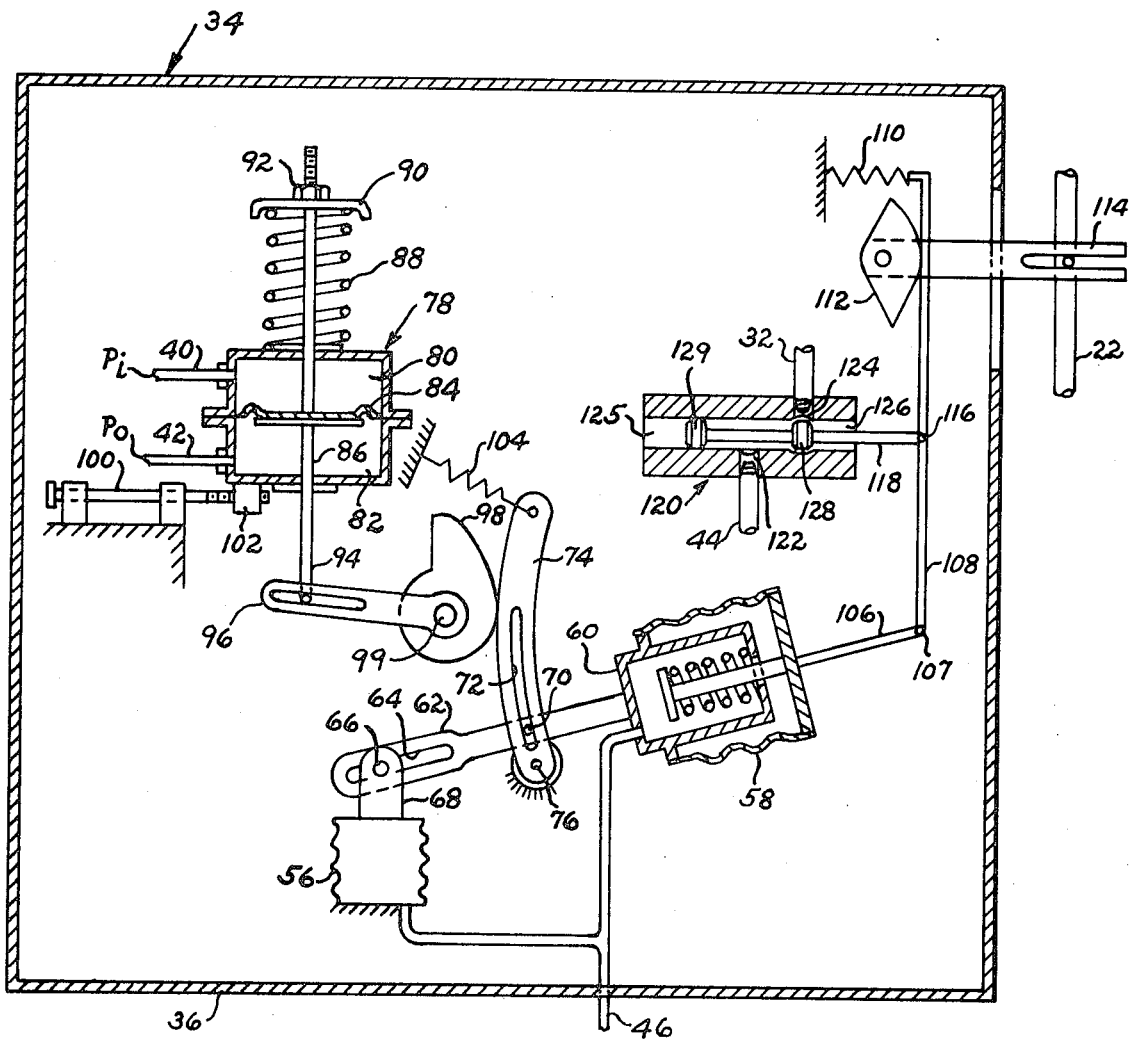
FIG. 4 is a schematic illustration of the positioning mechanism according to the invention.

Referring to FIG. 4, the mechanism for positioning the valve includes conduit 46 for supplying the controller air signal to bellows 56 and 58. Bellows 58 has a base 60 connected to link 62. Link 62 is provided with slot 64 at one end engaged by pin 66 carried by link 68 extending from the top side of bellows 56. Link 62 has a pin 70 adapted to ride in slot 72 of lever 74 which is pivoted at 76. The inlet pressure $P_i$ and the outlet pressure $P_o$ are fed by conduits 40 and 42 to opposite sides of differential pressure sensing device 78. The latter device may be in the form of a bellows or diaphragm actuator having chambers 80 and 82 on opposite sides of diaphragm 84. The diaphragm is fixed to a stem 86 so that the position of the stem is determined by the pressures in chambers 80 and 82. The upper end of stem 86 extends through spring 88 which is seated on plate 90. The upper end of stem 86 is threaded and provided with nut 92 for presetting the initial position of stem 86 for valves having different pressure drops thereacross. The lower end of the stem is connected by links 94, 96 to cam 98 which rotates about fixed pivot 99. Differential pressure device 78 is attached to a suitable mechanism such as screw and nut arrangement 100, 102 for initially adjusting device 78 laterally to provide the same angular rotation of cam 98 for a particular ratio of $\Delta P2/\Delta P1$, where the initial pressure drop $\Delta P1$ may have a different magnitude in each application, and $\Delta P2$ is the value at another position of the valve. Cam 98 is cut so that its effective radius varies as the square root of its angle of rotation, and since lever 74 is held against cam 98 by spring 104, it moves a distance proportional to the square root of the pressure differential change across the valve. As lever 74 is moved, it causes link 62 to move and therefore moves bellows 58 bodily. The amount of bodily movement of bellows 58 is determined also by the position of pin 70, and thus by the magnitude of the controller signal. Bellows 58 is is connected to link 106. Link 106 is connected by pivot 107 to the lower end of beam or lever 108. The upper end of lever 108 is held by spring 110 against cam 112. Cam 112 is connected to valve stem 22 by link 114 so that cam 112 rotates as stem 22 moves longitudinally. The upper end of lever 108 is then moved about pivot 107 in accordance with the longitudinal movement of valve stem 22 to provide a linear feedback of valve position. Lever 108 has a floating pivot 116 at an intermediate point thereof. Rod 118 extends from pivot 116 to pilot valve 120, which has a high pressure air inlet 122 and an outlet 124 connected via conduit 32 to diaphragm actuator 24. Valve 120 also has a bore 125, an exhaust port 126, valve member 128, and piston 129. As valve member 128 is moved by rod 118 across port 124, more or less of the air supply at inlet 122 is transmitted through conduit 32 to the actuator 24. Valve 120, as shown in FIG. 4, is representative of a suitable metered pilot valve.

Differential pressure device 78 and cam 98 produces a movement of lever 74 proportional to the square root of the pressure drop change across valve 10. The movement of lever 74 is multiplied by the lever arm defined by the position of pin 70 relative to pivot 76, and the product of these two quantities determines the longitudinal movement of link 62 and of the base 60 of bellows 58. Bellows 58 is expanded by the controller signal furnished thereto by line 46. Hence, the movement of link 106 includes a component proportional to the controller signal and a component proportional to the required pressure drop compensation. This movement is imparted to the lower end of lever 108. The upper end of lever 108 is moved an amount corresponding to the opening of valve 10 in such a way that the movements at the opposite ends of the lever are effectively subtracted from each other. Thus, the floating pivot 116 is moved in accordance with the difference between the existing valve position and the required compensated valve position. This difference is supplied through rod 118 to pilot valve 120 and changes the air pressure fed to actuator 24. Thus, plug 20 is re-positioned in response to the control signal communicated through conduit 46 and to compensate for the change in the pressure drop across the valve.

What is claimed is:

1. Apparatus for compensating variations in the fluid pressure drop across a valve having an operator; comprising first means for supplying a valve control signal; second means for producing a quantity proportional to the square root of the pressure drop across the valve; third means for multiplying said quantity by a quantity proportional to the magnitude of the control signal; fourth means for adding the product of said quantities to another quantity proportional to the control signal; fifth means for producing a displacement representing the difference between the added quantities and a quantity representing the position of the valve; and means for actuating said operator in accordance with said displacement to adjust the valve to a position permitting a flow rate substantially proportional to the control signal.

2. Apparatus according to claim 1, wherein the operator is fluid pressure actuated, and the means for actuating the operator includes a pilot valve having an inlet port, a venting port, and an outlet; means for supplying a constant air pressure to the inlet port; and means for connecting the outlet to said operator, said pilot valve being responsive to said fifth means for varying the flow through at least one of said ports.

3. Apparatus according to claim 2, wherein said control signal is an adjustable, fluid pressure signal; and said fourth means includes an air motor having a diaphragm movable by the control signal; and means for moving said air motor bodily in response to said third means.

4. Apparatus according to claim 1, wherein said valve has a reciprocating valve member, and a body having port openings providing an effective flow area which varies linearly with the displacement of the valve member.

5. Apparatus according to claim 4, wherein said port openings are rectangular.

6. Apparatus according to claim 1, wherein said second means includes means for adjusting the proportionality of the square root of the pressure drop across the valve to the quantity produced by said second means.

7. Apparatus for compensating variations in the pressure drop across a valve; comprising a valve having a fluid actuated operator and a reciprocating valve member; first means for supplying a control signal; second means for producing a first displacement proportional to the square root of the pressure difference across the valve; third means for adding said displacement to a second displacement proportional to the control signal; fourth means for obtaining a third displacement representing the difference between the added displacements and a quantity representing the position of the valve member; and means for actuating said operator in accordance with the third displacement to adjust the valve to a position permitting a flow rate substantially proportional to the control signal.

8. Apparatus for compensating variations in the pressure drop across a valve; comprising a servo control system having a fluid pressure actuated operator; first means for supplying a control signal; second means for producing a displacement proportional to the square root of the pressure difference across the valve multiplied by a quantity proportional to the control signal to produce a second displacement; means for adding the second displacement to a third displacement proportional to the control signal; means for obtaining a fourth displacement representing the difference between the sum of the second and third displacements and a quantity representing the position of the valve; and fluid pressure supply means for actuating said operator in accordance with the fourth displacement to adjust the valve to a position permitting a flow rate substantially proportional to the control signal.

* * * * *